Patented Jan. 7, 1936

2,027,316

UNITED STATES PATENT OFFICE 2,027,316

CATALYST

Edward S. Johnson, New Rochelle, N. Y., assignor to The Calco Chemical Co. Inc., Bound Brook, N. J., a corporation of Delaware No Drawing. Application March 1, 1935,
Serial No. 8,887

16 Claims. (Cl. 23—234)

This invention relates to vanadium catalysts for catalytic oxidations and more particularly to vanadium catalysts for the catalytic oxidation of sulfur dioxide to sulfur trioxide.

In the past a number of catalysts have been proposed and used for the contact sulfuric acid process using various compounds of vanadium as the active catalytic element. These catalysts for the most part require various carriers and it has been found in practice that the nature of the carrier is in many cases as important and sometimes more important than the nature of the catalytically active compound coated on or incorporated therewith. Various attempts have been made to utilize silica gel prepared in an acid medium as a catalyst carrier but with poor success as it does not permit the production of a vanadium catalyst of high activity. In view of the great activity of the vanadium zeolites which are, of course, strongly alkaline gels, attempts were made to prepare an alkaline silica gel at ordinary temperatures; even when considerable dilution was employed these attempts proved to be unsuccessful as the gel disintegrated into small curds.

According to the present invention it has been found that these curds of silica gel produced in an alkaline or substantially neutral medium when ground or otherwise mixed with the desired vanadium compounds they result in a pasty mass which can be pressed into pellets. These pellets, despite the foregoing disintegration of the gel curds, show a surprising catalytic activity. Not only do catalysts formed from alkaline silica gel curds show greater activity by far than any catalyst prepared with acid silica gel of commerce, but due to the fact that the curds are mechanically incorporated with solid vanadium compounds an extremely cheap method of production is achieved. The production is considerably cheaper than when a true alkaline silica gel is prepared under special conditions as described and claimed in my copending application Serial No. 687,010 filed August 26, 1933 and the activity is of the same high order. Because of the difficulty of accurate analysis of the gelatinous products, the reason for the extraordinarily high activity of the catalyst made with the alkaline gel curds is not fully known. In the case of the alkaline silica gel in massive form, the porosity appears to be of an extraordinarily minute character comparable with that of the zeolite gels and probably such minute porosity also exists in the gel curd formed in alkaline media under ordinary conditions. It is probable that this is one factor of the high activity of the catalyst of the present invention. It should be understood of course, that the invention is in no sense limited to this or any other particular theory of action of the catalyst.

The curds may be prepared under widely differing conditions and either sodium or potassium silicate solutions may be used. In general it is desirable to dilute the silicate solution from its normal commercial strength of about 30°–33° Bé. The dilution is not critical nor is the temperature, and it is not necessary to use the very low temperatures required in the formation of coherent blocks of alkaline silica gel. This is one of the advantages of the present invention that the preparation of the silica gel curds does not require such exact adjustment of conditions. In order to keep the mixture alkaline, it is, of course, necessary to add the neutralizing acid to the silicate solution rather than the contrary.

The particular acid used is not of primary importance, the ordinary mineral acids being substantially equivalent. Therefore, since sulfuric acid is by far the cheapest mineral acid and gives entirely satisfactory results, it is normally preferred for commercial production of gel curds for reasons of economy, but the preparation may be carried out with other acids such as hydrochloric and the use of such acids is of course included in the present invention.

After the curds have been prepared they may be washed free from salts although no particular harm results if some of the salts remain, particularly when the preparation is from potassium silicate. Care should be taken of course, to keep the proportions of potassium and vanadium in the final catalyst within the ranges that give the best results. The gel curds are very highly hydrous, containing normally from 16–17% of $SiO_2$ with the remainder mostly water. They are kneaded with the catalytic salts which may, for example, be ammonium vanadate and potassium sulfate and on kneading apparently a considerable portion of the water in the gel is drawn out by the dry salts because a thin paste of thick slurry is usually obtained. This may be dried to a caking consistency with continuous kneading, and then formed into blocks or compressed into pellets; for example, in a pelleting machine of the automatic type. If the material is thoroughly dried it may of course, be ground and moistened and then pressed as above described. In general, the pelleting of the product follows substantially ordinary pelleting practice and it is an advantage of the present invention that special pelleting procedure is normally unnecessary. The final pellets obtained are very hard and resistant and stand up satisfactorily in ordinary use. For catalytic oxidations they are preferably first calcined with sulfur dioxide gases in the usual manner.

The proportions of silica and vanadium may vary within wide limits. Thus, for example, when a total amount of vanadium is one by weight, from 10 to 20 parts of $SiO_2$ in the form of the gel may be used and give good results. In general, I find that about 15 parts of $SiO_2$ gives a catalyst of the best properties and I prefer to use substantially this proportion although, of course, other proportions of $SiO_2$ are included.

The vanadium compound is associated with an alkali metal compound as a promoter. Promoting action of the alkali metals is substantially the same with the present carrier as with other silica carriers. That is to say, potassium is a more effective promoter than sodium, and caesium and rubidium are still more active. Thallium compounds are also very effective. The molar ratio of vanadium and potassium may vary but in general should be between 1:2½ to 1:3½ with a ratio of 1:3 giving about optimum results. The particular ratios of vanadium compound to promoter are not changed when the gel curds are used as a carrier in the present catalyst, and it is an advantage of the present invention that the experience in promotion of the vanadium catalyst is completely applicable to new catalysts which adds greatly to their utility in oxidation reactions. The above proportions are, of course, for the contact sulfuric acid process. Different proportions of vanadium to promoter, or in the case of organic oxidations it is more correct to call it stabilizer, will vary with different reactions. Thus, for example, many organic oxidations require a considerably lower potassium to vanadium ratio than gives optimum results in the contact sulfuric acid process. In each case the best ratio of vanadium to promoter or stabilizer should be chosen in accordance with the reaction in which the catalyst is to be employed.

The vanadium compound may be of various types such as, for example, ammonium vanadate, potassium vanadate, vanadyl sulfate and the like. Similarly the alkali metal compound may be of various kinds such as sulfates, chlorides, etc. Of course when an alkali metal vanadate is used, the amount of alkali metal in the vanadate must be taken into consideration. Since the common vanadium and potassium compounds are of substantially equivalent effectiveness, it is preferable to use ammonium vanadate on account of its cheapness and potassium sulfate, the latter of course, does not suffer a change in acidic radical on calcination.

The invention will be described in detail in conjunction with the following specific examples:

*Example 1*

1145 parts by weight of 30°–33° Bé. potassium silicate solution are diluted with substantially 45% of water amounting to 515 parts and 13% sulfuric acid is gradually added until the mixture becomes about neutral or shows a slight transient acidity to Congo. When the precipitation is nearly finished the charge becomes a mass of lumps which on further addition of the last acid break down into curds. The curds are then filtered and washed with water to remove salts. A gel is obtained containing about 16–17% of $SiO_2$. An amount of the gel containing 15 parts of $SiO_2$ is mixed with 1 part of vanadium in the form of ammonium metavanadate and 3 parts of potassium sulfate. The ammonium vanadate and potassium sulfate are in a finely ground state and are thoroughly kneaded with the gel. The mass becomes a thin paste and a thorough mixture is obtained, the amount of water in the gel being apparently sufficient to dissolve the vanadate and potassium sulfate sufficiently to give a very uniform distribution. The working of the mass is continued for a half hour or somewhat more, the excess water drawn off from the paste with moderate warming under continued kneading until a stiff plastic mass results. This mass is moulded into cakes or pellets and dried at 60° C. for some 12 to 16 hours, after which time it is still slightly moist. Thereupon the temperature is raised to about 160° for about 1 hour and then calcination with $SO_2$ and oxygen gases is effected with gradually increasing temperatures and increasing concentration of $SO_2$.

When tested for conversion of $SO_2$ to $SO_3$ a conversion of better than 98% is obtained at 425° C. at normal loading with a 7.5% gas and the conversion at this temperature is still over 97 even with a gas flow approximately 50% in excess of normal commercial loading.

*Example 2*

Gel curds are prepared as in Example 1, but using sodium silicate instead of potassium silicate. The curds are substantially the same character as those obtained from potassium silicate and contain about the same percentage of $SiO_2$. An amount of gel containing about 20 parts of $SiO_2$ is then kneaded with 1 part of vanadium in the form of ammonium metavanadate and potassium sulfate in the molar ratio of from 1 V:2½ K to 1 V:3 K. The same phenomenon of thinning is observed but to a somewhat greater degree because of a larger amount of gel present. The kneaded mass after thorough distribution of the vanadium and potassium compounds is dried, pelleted and calcined as described in Example 1. When tested for conversion the results are substantially the same as the catalyst described in Example 1.

What I claim is:

1. A vanadium contact mass for catalytic oxidations comprising a vanadium compound homogeneously incorporated in gelatinous curds of hydrous $SiO_2$, produced by acidification of a silicate solution under conditions alkaline or neutral to Congo.

2. A vanadium contact mass for catalytic oxidations comprising a vanadium compound and a compound of an alkali metal, homogeneously incorporated in gelatinous curds of hydrous $SiO_2$, produced by acidification of a silicate solution under conditions alkaline or neutral to Congo.

3. A vanadium contact mass for catalytic oxidations comprising a vanadium compound and a potassium compound homogeneously incorporated in gelatinous curds of hydrous $SiO_2$, produced by acidification of a silicate solution under conditions alkaline or neutral to Congo.

4. A vanadium contact mass for catalytic oxidations comprising a vanadium compound and a compound of potassium in a molecular ratio of from 1 V:2.5 K to 1 V:3½ K, homogeneously incorporated in gelatinous curds of hydrous $SiO_2$, produced by acidification of a silicate solution under conditions alkaline or neutral to Congo.

5. A vanadium contact mass for catalytic oxidations comprising a vanadium compound and a compound of potassium in a molecular ratio from 1 V:3 K, homogeneously incorporated in gelatinous curds of hydrous SiO₂, produced by acidification of a silicate solution under conditions alkaline or neutral to Congo.

6. A catalyst according to claim 2 in which the amount of SiO₂ is from 10–20 parts per part of vanadium.

7. A catalyst according to claim 3 in which the amount of SiO₂ is from 10–20 parts per part of vanadium.

8. A catalyst according to claim 2 in which the amount of SiO₂ is 15 parts per part of vanadium.

9. A catalyst according to claim 3 in which the amount of SiO₂ is 15 mols per mol of vanadium.

10. A catalyst according to claim 4 in which the amount of SiO₂ is 15 parts per part of vanadium.

11. A process of producing a catalyst for oxidation reactions which comprises preparing curds of gelatinous SiO₂ by adding an acid to a silicate solution under such conditions that the end product is neutral or faintly alkaline to Congo and the gel is precipitated in the form of curds, kneading the curds of gel with finely divided solid compounds of vanadium and of an alkali metal until homogeneous distribution is effected, partial drying and forming the mixture into shapes suitable for catalysis.

12. A method according to claim 11 in which the alkali metal compound is a potassium compound.

13. A method according to claim 11 in which the vanadium and potassium compounds are substantially in the molar proportion of 1 V:2½ K, to 1 V:3½ K.

14. A method according to claim 11 in which the vanadium and potassium compounds are substantially in the molar proportion of 1 V:3 K.

15. A method according to claim 11 in which the vanadium and potassium compounds are substantially in the molar proportion of 1 V:2½ K to 1 V:3½ K and the amount of curds contain from 10–20 parts of SiO₂ per part of vanadium.

16. A method according to claim 11 in which the vanadium and potassium compounds are substantially in the molar proportion of 1 V:3 K and the amount of curds contain from 10–20 parts of SiO₂ per part of vanadium.

EDWARD S. JOHNSON.